(12) United States Patent
Yoon

(10) Patent No.: US 9,998,289 B2
(45) Date of Patent: Jun. 12, 2018

(54) APPARATUS AND METHOD FOR SUPPLYING POWER

(71) Applicant: Hanwha Techwin Co., Ltd., Changwon-si (KR)

(72) Inventor: Hyun Kyoung Yoon, Changwon-si (KR)

(73) Assignee: Hanwha Techwin Co., Ltd., Changwon-si ( * ) Notice: Subject to any disclaimer, the term of this patent is extended or adjusted under 35 U.S.C. 154(b) by 0 days. days.

(21) Appl. No.: 15/297,380

(22) Filed: Oct. 19, 2016

(65) Prior Publication Data

US 2017/0118031 A1    Apr. 27, 2017

(30) Foreign Application Priority Data

Oct. 21, 2015    (KR) .................... 10-2015-0146558

(51) Int. Cl.
*G06F 1/26* (2006.01)
*H04L 12/10* (2006.01)
*H04B 3/54* (2006.01)

(52) U.S. Cl.
CPC ............. *H04L 12/10* (2013.01); *H04B 3/54* (2013.01)

(58) Field of Classification Search
CPC .................................. H04B 3/54; H04L 12/10
See application file for complete search history.

(56) References Cited

U.S. PATENT DOCUMENTS

2007/0233323 A1* 10/2007 Wiemeyer ............. G05B 15/02
700/276
2010/0199113 A1    8/2010 Lee
2014/0325245 A1* 10/2014 Santini ..................... H02J 1/14
713/300

FOREIGN PATENT DOCUMENTS

| JP | 4551830 | 4/2010 |
|---|---|---|
| JP | 4912269 | 4/2012 |
| KR | 10-2010-0088792 | 8/2010 |

* cited by examiner

*Primary Examiner* — Ross Varndell
(74) *Attorney, Agent, or Firm* — H.C. Park & Associates, PLC

(57) ABSTRACT

An apparatus for supplying power includes a converter configured to output power by transforming external power, and a controller configured to determine whether a total power consumption of a powered device (PD) continues to exceed a maximum power that can be supplied from the apparatus for a time greater than a first period of time, in response to an additional power supply request from the PD.

15 Claims, 3 Drawing Sheets

APPARATUS AND METHOD FOR SUPPLYING POWER

CROSS REFERENCE TO RELATED APPLICATION

This application claims priority from and the benefit of Korean Patent Application No. 10-2015-0146558, filed on Oct. 21, 2015, which is hereby incorporated by reference for all purposes as if fully set forth herein.

BACKGROUND

Exemplary embodiments relate to an apparatus and method for supplying power, and more particularly, to an apparatus and method for supplying power to powered devices (PDs) in response to power supply requests therefrom.

DISCUSSION OF THE BACKGROUND

Ethernet is a type of local area network (LAN) that is widely used as a communication technique. The details of Ethernet may be found in the Institute of Electrical and Electronics Engineers (IEEE) 802.3 standard. Power over Ethernet (PoE) is a technique for supplying not only data, but also power, to devices connected to an Ethernet via one cable. PoE systems may obviate the need of various cables for connection, and thus, may allow cables to be easily managed. PoE systems may also be easily installed at places where the supply and control of power is relatively difficult at a lower cost. For these reasons, PoE systems have been widely used.

In general, a device for supplying power in a PoE system is referred to as power sourcing equipment (PSE), and a device for receiving power is referred to as a powered device (PD). Since a LAN cable generally used for data communication is used to supply power in a PoE system, maximum power that may be supplied from PSE to each PD may be limited. Thus, conventionally, as the power consumption of PDs increases, it may be nearly impossible to sufficiently supply power to all PDs, which may cause at least some of the PDs to malfunction.

To address these problems, a PSE having a large capacity has been suggested, however. However, such a technique may require large investment and generate high heat and noise.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a system and method capable of preventing errors that may be caused when the power supplied to a powered device (PD) connected to one port is reduced due to an unnecessary power supply request from another PD connected to a different port.

Exemplary embodiments also provide a system and method capable of preventing such error at a lower cost and generating less heat and noise.

Additional aspects will be set forth in part in the detailed description which follows and, in part, will be apparent from the disclosure, or may be learned by practice of the inventive concept.

An exemplary embodiment discloses an apparatus for supplying power including a converter configured to output power by transforming external power, and a controller configured to determine whether a total power consumption of a powered device (PD) continues to exceed a maximum power that can be supplied from the apparatus for a time greater than a first period of time, in response to an additional power supply request from the PD.

An exemplary embodiment also discloses an apparatus for supplying power including a converter configured to output power by transforming external power, and a controller configured to cut off power supplied to one or more ports in response to receiving an additional power supply request from a powered device (PD) configured to receive the power, if a total power consumption of the PD exceeds a maximum power that can be supplied from the apparatus, in which if the PD is a new device connected to the apparatus, the controller is configured to cut off power supplied to a port connected to the PD.

An exemplary embodiment further discloses a method of controlling the supply of power including the steps of receiving, by an apparatus for supplying power, an additional power supply request from a powered device (PD), determining whether total power consumption of the PD exceeds a maximum power that can be supplied from the apparatus, sampling the total power consumption at regular intervals of time if the total power consumption exceeds the maximum power, and cutting off the supply of power to one or more ports if the total power consumption continues to exceed the maximum power for a time greater than a first period of time.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
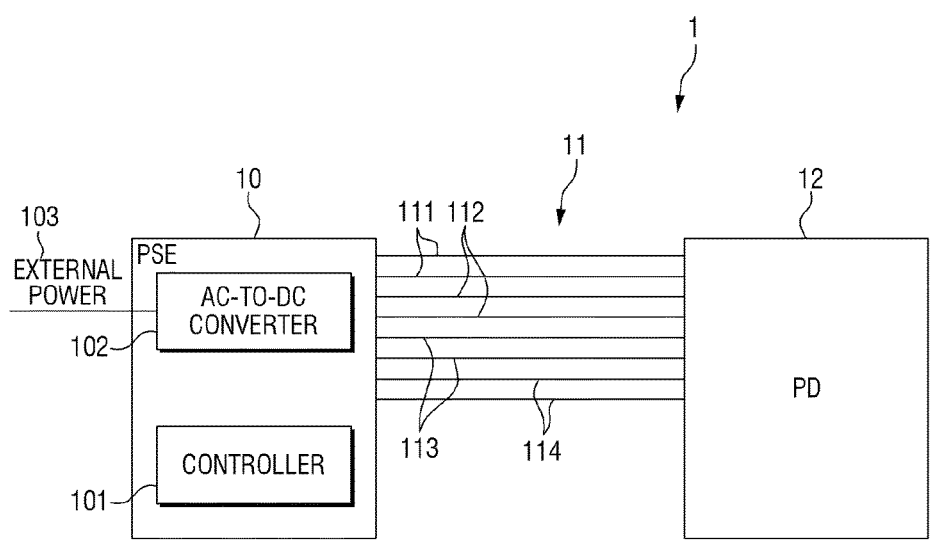
FIG. 1 is a block diagram of a system for controlling supply of power according to an exemplary embodiment.

FIG. 1 is a block diagram of a system for controlling supply of power according to an exemplary embodiment.

Referring to FIG. 1, a system 1 for controlling the supply of power includes an apparatus 10 for supplying power to the outside thereof, an apparatus 12 for receiving power from the apparatus 10, and a power supply line 11 connecting the apparatus 10 and the apparatus 12. A Power over Ethernet (PoE) system may be used in the system 1. As used herein, the system 1 will be described as utilizing a PoE system. It is contemplated that, however, the system 1 may use various power supply systems other than the PoE system.

A PoE system may include a system that follows the Institute of Electrical and Electronics Engineers (IEEE) 802.3 standard disclosed in 2003 and a PoE+ (PoE Plus) system that follows the IEEE 802.3AT standard disclosed in 2009. PoE and PoE+ (PoE Plus) may differ in the levels of power and voltages input to, or output from, power sourcing equipment (PSE) and powered devices (PDs).

As illustrated in FIG. 1, in a PoE system, PSE is used as the apparatus 10, a PD is used as the apparatus 12, and a local area network (LAN) cable is used as the power supply line 11.

The PSE 10 includes external power 103 applied from outside the PSE 10, an alternating current (AC)-to-direct current (DC) converter 102 transforming the external power 103, and a controller 101 receiving a power supply request from the PD 12 and distributes and controls the supply of power from the PSE 10 in accordance with the received power supply request.

The external power 103 may be AC power, for example, 220 V AC. The AC-to-DC converter 102 may transform the external power 103 into a DC voltage and reduces the voltage of the external power 103. When a PoE system that follows the IEEE 802.3af standard is used, the AC-to-DC converter 102 may transform the external power 103 into a DC voltage of 44.0 V to 57.0 V. When a PoE+ (PoE Plus) system that follows the IEEE 802.3AT standard is used, the AC-to-DC converter 102 may transform the external power 103 into a DC voltage of 50.0 V to 57.0 V.

The controller 101 may measure, determine, and control the amount of power that may be generated in the system 1, the number of ports of the system 1, and the like. More specifically, the controller 101 may determine whether the external power 103 is properly supplied and whether the AC-to-DC converter 102 properly performs the transforming function. The controller 101 may receive an additional power supply request from the PD 12, and distributes the power provided by the PSE 10 to a corresponding port.

The controller 101 may determine whether a total power consumption T of the PD 12 is excessive. To determine whether the total power consumption T is excessive, the controller 101 may compare a margin power B with a maximum power A that may be supplied subtracted by the total power consumption. If the maximum power A subtracted by the total power consumption T is less than the margin power B, the controller 101 may compare the maximum power A and the total power consumption T. If the total power consumption T is determined to exceed the maximum power A, the controller 101 may perform power sampling on a port sending an additional power supply request. The maximum power A, the total power consumption T, and the margin power B will be described later in more detail.

When the additional power supply request is determined as a temporary request based on the results of the power sampling, the controller 101 may maintain supplying power to the port sending the additional power supply request. On the other hand, when the additional power supply request is determined as a continuous request based on the results of power sampling, the controller 101 may cut off power supplied to the port sending the additional power supply request. Methods of performing power sampling, determining whether the additional power supply request is a temporary request or a continuous request, and cutting off power supplied to the port sending the additional power supply request will be described later in detail.

The LAN cable 11 may generally be classified into an unshielded twisted pair (UTP) cable, a shielded twisted pair (STP) cable, a foiled twisted pair (FTP) cable, or the like, depending on how the wires thereof are shielded. STP and FTP cables generally have an excellent noise shielding function, but UTP cables are generally cheaper than STP and FTP cables, and thus, are more widely used. In an exemplary embodiment, a UTP cable may be used as the LAN cable 11, but the present disclosure is not limited thereto. That is, various LAN cables other than a UTP cable may be used as the LAN cable 11.

In a PoE system, the use of a Category 3 (Cat.3) (or higher) UTP cable is required, and in a PoE+ (PoE Plus) system, the use of a Category 5 (Cat.5) (or higher) UTP cable is required. These requirements are based on the performance levels of UTP cables available at the times of establishment of the IEEE 802.3af standard and the IEEE 802.3AT standard, respectively. Cat.3 and Cat.5 represent UTP cabling standards, and there are various other UTP cabling standards for various bandwidths, such as Cat.5, Cat.5E, Cat.6, Cat.6E, and Cat.7.

In a UTP cable, four twisted wire pairs (TPs) having different colors such as orange, green, blue, and brown are provided. In general, the orange and green TPs are used in data communication, and the blue and brown TPs are for telephone usage or are reserved for later standards. To use a UTP cable, four TPs at either end of the UTP cable (i.e., eight wires) are all connected to an 8-pin RJ-45 connector.

As illustrated in FIG. 1, the LAN cable 11 may include a first TP 111, a second TP 112, a third TP 113, and a fourth TP 114. Each of the first, second, third, and fourth TPs 111, 112, 113, and 114 connects the PSE 10 and the PD 12 so as to supply power from the PSE 10 to the PD 12, and to transmit data between the PSE 10 and the PD 12. As mentioned above, in a PoE system, the supply of power and data communication may be both performed via a single LAN cable, because a DC common-mode voltage may not affect data. The first and second TPs 111 and 112 may be used to supply PoE power, and the third and fourth TPs 113 and 114 may not be in use. More specifically, for example, the first TP 111 may be connected to a voltage of 44 V, the second TP 112 may be connected to a low voltage of, for example, 0 V, and the third and fourth TPs 113 and 114 may not perform any functions. However, the present disclosure is not limited to these examples, and the LAN cable 11 may supply power and perform data communication in various manners other than those described herein.

The PD 12 may perform its functions by being supplied with power from the PSE 10. In a PoE system, the PD 12 may generally be an access point, a closed circuit television (CCTV) camera, an internet protocol (IP) phone, a computing device, or the like, and driving different PDs 12 may require different levels of power. In a PoE system, in order for the PSE 10 to supply power to the PD 12, a handshake is performed therebetween to determine whether the PD 12 is a device to which a PoE system is applicable. More specifically, current is applied to the PD 12 at regular intervals of time via TPs connected to the PD 12, and the applied current is detected from the PD 12 to determine whether there exists characteristic impedance in the PD 12. Characteristic impedance may be a resistance of about 25 KΩ. In order for a PoE system to be applicable to the PD 12, the PD 12 may have characteristic impedance therein.

Figure 2:
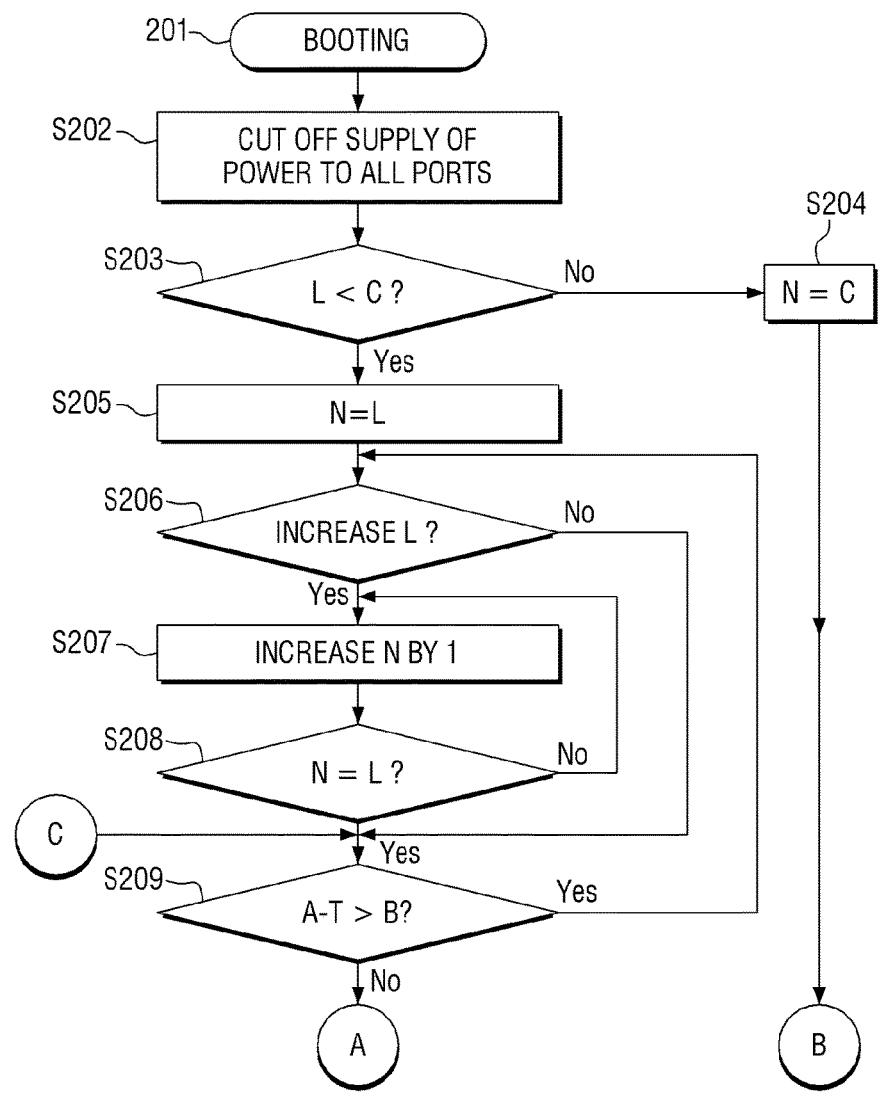
FIG. 2 is a flowchart illustrating steps of a method of controlling supply of power according to an exemplary embodiment.

FIG. 2 is a flowchart illustrating steps of a method of controlling the supply of power according to an exemplary embodiment.

Referring to FIG. 2, in response to a PoE system being turned on to be booted (S201), the supply of power to all ports of PSE is cut off (S202). That is, a port quantity N becomes 0. The port quantity N indicates the number of ports currently supplied with power from the PSE.

Thereafter, the PSE supplies power to each of the ports to which PDs are connected. A port quantity L and an initial maximum allowed port quantity C are compared (S203). When the port quantity L is greater than the initial maximum allowed port quantity C, power may be supplied to a number of ports corresponding to the initial maximum allowed port quantity C (N=C) (S204). On the other hand, when the port quantity L is less than the initial maximum allowed port quantity C, power may be supplied to a number of ports corresponding to the port quantity L (N=L) (S205).

The port quantity L indicates the number of ports currently connected to the PSE. Assuming that each of the ports consumes as much power as they can, the initial maximum allowed port quantity C indicates the maximum number of ports that may be supplied with power from the PSE. The initial maximum allowed port quantity C may be obtained by dividing the maximum power A by the maximum power that can be consumed by each of the ports.

The maximum power that can be consumed by each of the ports may be 15.95 W in a PoE system that follows the IEEE 802.3af standard, and 25.5 W in a PoE+ (PoE Plus) system that follows the IEEE 802.3AT standard. Thus, if the maximum power A is 200 W and a PoE+ (PoE Plus) system is used, the initial maximum allowed port quantity C is calculated to be 7 (200 W±25.5 W). As used herein, any power loss is ignored for convenience of description. In steps S204 and S205, the maximum number of ports that can be supplied with power from the PSE cannot exceed the initial maximum allowed port quantity C because, since at an early stage of booting, the PSE is yet to supply power and the amount of power to be consumed by each of the ports cannot be determined, and thus, it is assumed that each of the ports consumes as much power as it can.

When the port quantity L is less than the initial maximum allowed port quantity C, power may be supplied to a number of ports corresponding to the port quantity L (N=L) (S205), because the maximum power A is sufficient to power all ports connected to the PSE. When there is an increase in the port quantity L due to the addition of a new port (S206), the PSE may also supply power to the new port. In an exemplary embodiment, if multiple ports are newly connected at the same time, power may not be supplied to the multiple ports at the same time, but one after another (S207 and S208). Alternatively, power may be supplied to all or some of the multiple ports at the same time. If there is no new port (S206), steps S207 and S208 may be omitted.

If the port quantity L increases due to power being supplied to the new port, the total power consumption T is increased. The total power consumption T indicates the total amount of power consumed by all PDs connected to, and supplied with power from, the PSE. Even when no new port is added, the total power consumption T may increase due to an increase in the power consumption of existing ports, for example, due to a turn-on of the lightings of CCTV cameras connected to the PSE. If there is a need of additional supply of power by each of the ports, a corresponding PD may send a power supply request to the PSE. Then, the PSE may supply additional power to the corresponding PD first. Since the maximum power A is limited, the chip in the PSE or the PSE itself may be damaged or broken if the total power consumption T increases excessively. Thus, if the total power consumption T increases regardless of the addition of a new port, the total power consumption T needs to be reduced.

Figure 3:
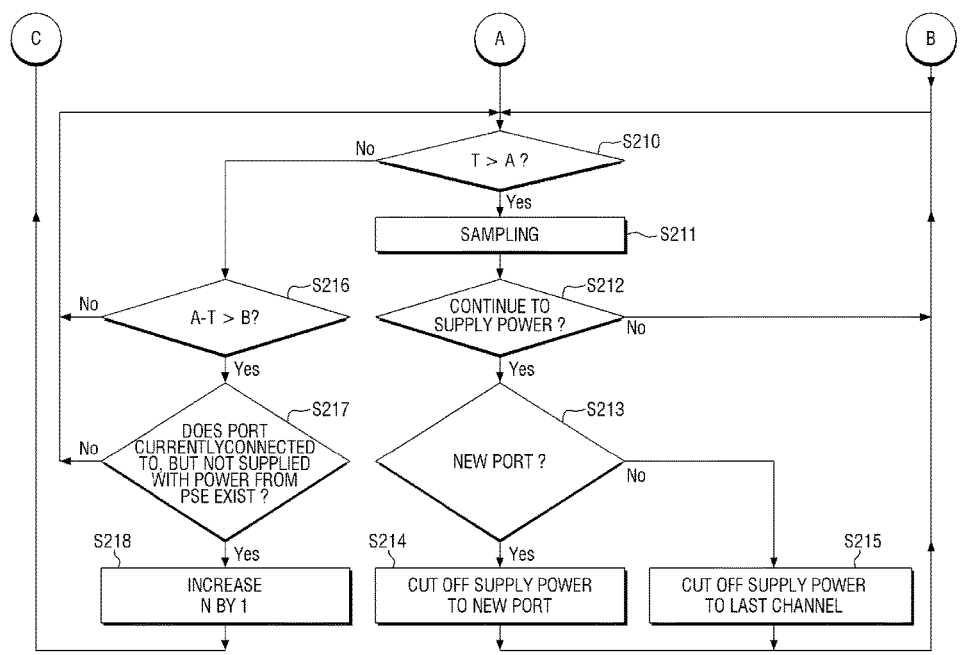
FIG. 3 is a flowchart illustrating steps of a method of controlling supply of power according to an exemplary embodiment.

FIG. 3 is a flowchart illustrating the rest of the steps illustrated with reference to FIG. 2.

Referring to FIGS. 2 and 3, to lower the total power consumption T, the margin power B is compared with the maximum power A subtracted by the total power consumption T (S209). The margin power B indicates a margin set to prevent the amount of power supplied by the PSE exceeding the maximum power A when the PSE supplies additional power or resumes the supply of power after a power cutoff. If maximum power A subtracted by the total power consumption T is greater than the margin power B (S209), the PSE may have the capacity to supply further power, and thus, the PSE continues to supply power until another port is additionally connected thereto. On the other hand, if the maximum power A subtracted by the total power consumption T less than the margin power B (S209), the maximum power A and the total power consumption T may be compared at S210.

If the port quantity L is greater than the initial maximum allowed port quantity C, power may be supplied to the number of ports corresponding to the initial maximum allowed port quantity C (N=C) (S204), because given that each of the ports consumes as much power as they can, the maximum power A is not sufficient enough to power more than the number of ports corresponding to the initial maximum allowed port quantity C. In this case, there may exist a port currently connected to, but not supplied with power from, the PSE. This port may be a new port not supplied with any power from the PSE, or an existing port either not supplied with any power from the PSE or cut off from the supply of power by the PSE. Thus, a determination is made as to whether the PSE has the capacity to additionally supply power, and if the PSE is determined to have the capacity to additionally supply power, power needs to be supplied to this port as well. When the number of ports corresponds to the initial maximum allowed port quantity C (N=C) in step S204, the method proceeds directly to step S210, in which the maximum power A and the total power consumption T are compared, without going through steps S205 through S209.

If the total power consumption T exceeds the maximum power A (S210), it means that the power consumption of all PDs exceeds the maximum power A. It is noted that when the PSE supplies power beyond the maximum power A, the chip in the PSE or the PSE itself may not be instantly damaged or broken, if the degree to which the amount of power supplied by the PSE exceeds the maximum power A is not too excessive. However, since the PSE is highly likely to be damaged or broken, the total power consumption T may need to be reduced for safety purposes. Accordingly, power sampling is performed on a port sending an additional power supply request (S211). Power sampling is a process of sampling power additionally supplied from the PSE to the port sending the additional power supply request, at regular intervals of time for a predetermined period of time.

If the results of power sampling show that the level of power additionally supplied by the PSE for the predetermined period of time decreases (S212), the additional power supply request is determined to be a temporary request, and the supply of power to other existing ports is maintained. On the other hand, if the results of power sampling show that the level of power additionally supplied by the PSE for the predetermined period of time does not decrease (S212), the additional power supply request is determined to be a continuous request, and the supply of power to some ports is cut off to prevent the PSE from being damaged or broken.

If the port sending the additional power supply request is a new port (S213), the supply of power to the new port is cut off (S214). In this case, if a user wishes to use the new port, the supply of power to other ports may be adjusted and the new port may be reconnected.

On the other hand, if the port sending the additional power supply request is an existing port (S213), the supply of power to a port corresponding to a last channel number is cut off (S215). In order to prevent cutting off a power supply to a PD of greater importance than other PDs, a user may prioritize and connect the ports according to channel numbers. When supplying power to a particular port is cut off in step S214 or step S215, the port quantity N may be reduced by 1, and the method returns to step S210 in which the maximum power A and the total power consumption T are compared.

If the total power consumption T is less than the maximum power A (S210), the comparison of the margin power B with the maximum power A subtracted by the total power consumption T is performed again (S216), as in step S209. Step S209 is a determination step performed at an initial stage after booting, and step S216 is a determination step performed after the transition from step S209 to step S210 caused by at least one considerable increase in the total power consumption T. Accordingly, the steps of S209 and S216 are independent from each other.

If the maximum power A subtracted by the total power consumption T is greater than the margin power B (S216), it means that the PSE has the capacity to supply further power, and thus, a determination is made as to whether there exists a port currently connected to, but not supplied with any power from, the PSE (S217). If there exists a port currently connected to, but not supplied with any power from, the PSE (S217), power is supplied to the corresponding port, the port quantity N is increased by 1 (S218), and the method returns to step S209 in which the maximum power A subtracted by the total power consumption T is compared with the margin power B. On the other hand, if there does not exist a port currently connected to, but not supplied with any power from, the PSE (S217), it means that there is no need to additionally supply power, and the supply of power is smoothly continued as is and the method returns to S210 in which the maximum power A and the total power consumption T are compared.

If the maximum power A subtracted by the total power consumption T is less than the margin power B (S216), it means that the PSE does not have the capacity to supply further power, but the risk of damage is not yet high enough to cut off the supply of power to the ports. Thus, the method returns to step S210 in which the maximum power A and the total power consumption T are compared.

FIG. 3 shows steps S216 and S217 as separate steps, but the present disclosure is not limited thereto. For example, steps S216 and S217 may alternatively be performed in a different order from those disclosed herein or may alternatively be performed at the same time.

According to exemplary embodiments, a system and method of controlling supply of power may determine whether additional power supply requests from some PDs so as to prevent an occurrence of an error that may be caused when the supply of power to a PD connected to one port is cut back or cut off because of an unnecessary power supply request from a new or existing PD connected to another port. In addition, a system and method of preventing such error may be provided without a large-capacity PSE, and thereby, reducing the generation of heat and noise at a lower cost.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. An apparatus for supplying power, comprising:
   a converter configured to output power by transforming external power; and
   a controller configured to determine whether a total power consumption of a powered device (PD) continues to exceed a maximum power that can be supplied from the apparatus for a time greater than a first period of time, in response to an additional power supply request from the PD,
   wherein the controller is configured to cut off power supplied to a port connected to the PD, if the PD is a new device connected to the apparatus, or
   wherein the controller is configured to cut off power supplied to a port having a last channel number, if the PD is an existing device already connected to the apparatus.

2. The apparatus of claim 1, wherein the controller is configured to cut off power supplied to one or more ports, if the total power consumption of the PD continues to exceed the maximum power for a time greater than the first period of time.

3. The apparatus of claim 1, wherein the controller is configured to maintain supplying power to ports, if the total power consumption of the PD becomes less than the maximum power within the first period of time.

4. The apparatus of claim 1, wherein the controller is configured to determine whether the total power consumption continues to exceed the maximum power for a time greater than the first period of time, if the maximum power subtracted by the total power consumption is less than a margin power.

5. The apparatus of claim 1, wherein the controller is configured to determine whether the total power consumption continues to exceed the maximum power for a time greater than the first period of time by sampling the total power consumption at regular intervals of time.

6. An apparatus for supplying power, comprising:
   a converter configured to output power by transforming external power; and
   a controller configured to cut off power supplied to one or more ports in response to receiving an additional power supply request from a powered device (PD) configured to receive the power, if a total power consumption of the PD exceeds a maximum power that can be supplied from the apparatus,
   wherein the controller is configured to cut off power supplied to a port connected to the PD, if the PD is a new device connected to the apparatus, or
   wherein the controller is configured to cut off power supplied to a port having a last channel number, if the PD is an existing device already connected to the apparatus.

7. The apparatus of claim 1, wherein the controller is configured to compare the maximum power subtracted by the total power consumption and a margin power, if the total power consumption is less than the maximum power.

8. The apparatus of claim 7, wherein the controller is configured to maintain supplying power to ports, if the maximum power subtracted by the total power consumption is less than the margin power.

9. The apparatus of claim 7, wherein the controller is configured to determine whether there exists a connected port not supplied with any power, if the maximum power subtracted by the total power consumption is greater than the margin power.

10. The apparatus of claim 6, wherein the controller is configured to cut off power supplied to the one or more ports, if the total power consumption continues to exceed the maximum power for a time greater than a first period of time.

11. The apparatus of claim 6, wherein the controller is configured to maintain supplying power to the one or more ports, if the total power consumption becomes less than the maximum power within a first period of time.

12. The apparatus of claim 6, wherein the controller is configured to determine whether the total power consumption continues to exceed the maximum power for a time greater than a first period of time by sampling the total power consumption at regular intervals of time.

13. A method of controlling supply of power, comprising:
   receiving, by an apparatus for supplying power, an additional power supply request from a powered device (PD);
   determining whether a total power consumption of the PD exceeds a maximum power that can be supplied from the apparatus;
   sampling the total power consumption at regular intervals of time if the total power consumption exceeds the maximum power; and
   cutting off power supplied to one or more ports if the total power consumption continues to exceed the maximum power for a time greater than a first period of time,
   wherein cutting off power comprises cutting off power supplied to a port connected to the PD, if the PD is a new device connected to the apparatus, or cutting off power supplied to a port having a last channel number, if the PD is an existing device already connected to the apparatus.

14. The method of claim 13, wherein the sampling the total power consumption at regular intervals of time comprises maintaining power supplied to ports, if the total power consumption becomes less than the maximum power within the first period of time.

15. The method of claim 13, wherein receiving the additional power supply request from the PD comprises:
   comparing a margin power and the maximum power subtracted by the total power consumption; and
   determining whether the total power consumption exceeds the maximum power if the maximum power subtracted by the total power consumption is less than the margin power.

* * * * *